(12) United States Patent
Ichihara et al.

(10) Patent No.: US 9,221,950 B2
(45) Date of Patent: Dec. 29, 2015

(54) POLYAMIDE RESIN COMPOSITION WITH EXCELLENT COLOR TONE

(71) Applicant: Toray Industries, Inc., Tokyo (JP)

(72) Inventors: Tomonori Ichihara, Nagoya (JP); Takahiro Kuribayashi, Nagoya (JP); Ichiro Kimijima, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/380,868

(22) PCT Filed: Feb. 26, 2013

(86) PCT No.: PCT/JP2013/054884
§ 371 (c)(1),
(2) Date: Aug. 25, 2014

(87) PCT Pub. No.: WO2013/129371
PCT Pub. Date: Sep. 6, 2013

(65) Prior Publication Data
US 2015/0011714 A1   Jan. 8, 2015

(30) Foreign Application Priority Data
Feb. 29, 2012 (JP) ................. 2012-043340

(51) Int. Cl.
| | | |
|---|---|---|
| C08K 5/34 | (2006.01) |
| C08G 69/00 | (2006.01) |
| C08L 77/00 | (2006.01) |
| C08G 69/50 | (2006.01) |
| C08K 5/3435 | (2006.01) |
| C08L 77/06 | (2006.01) |

(52) U.S. Cl.
CPC .............. *C08G 69/50* (2013.01); *C08K 5/3435* (2013.01); *C08L 77/06* (2013.01)

(58) Field of Classification Search
CPC .............................. C08L 79/04; C08L 2666/78
See application file for complete search history.

(56) References Cited

U.S. PATENT DOCUMENTS

| | | | | |
|---|---|---|---|---|
| 5,618,909 A | * | 4/1997 | Lofquist et al. | 528/310 |
| 6,150,496 A | | 11/2000 | Ilg et al. | |
| 2004/0176523 A1 | | 9/2004 | Weiss et al. | |
| 2009/0099318 A1 | * | 4/2009 | Miyamoto et al. | 525/421 |
| 2009/0149590 A1 | * | 6/2009 | Eroshov et al. | 524/417 |

FOREIGN PATENT DOCUMENTS

| | | |
|---|---|---|
| EP | 0675160 | 10/1995 |
| JP | 48-3211 | 1/1973 |
| JP | 08-041311 | 2/1996 |
| JP | 2911607 | 6/1999 |
| JP | 2002-503738 | 2/2002 |
| JP | 2002-223770 | 8/2002 |
| JP | 2002-223771 | 8/2002 |
| JP | 2004-114 | 1/2004 |
| JP | 2004-208646 | 7/2004 |
| JP | 2004-222569 | 8/2004 |
| JP | 2004-526853 | 9/2004 |
| JP | 2004-290091 | 10/2004 |
| JP | 2004-298034 | 10/2004 |
| JP | 2009-531505 | 9/2009 |
| JP | 2010-189467 | 9/2010 |
| JP | 2011-052034 | 3/2011 |
| JP | 2011-202103 | 10/2011 |

* cited by examiner

*Primary Examiner* — Ana Woodward
(74) *Attorney, Agent, or Firm* — DLA Piper LLP (US)

(57) ABSTRACT

A polyamide resin composition includes (a) a polyamide composed mainly of a polyamide backbone composed of diamine units composed mainly of 5-pentanediamine and dicarboxylic acid units, and (b) a compound with a molecular weight of 1,000 or less having a sterically hindered N atom and a nitrogen-containing functional group that can react with at least one of amino groups, carboxyl groups, and amide groups constituting the polyamide.

4 Claims, No Drawings

US 9,221,950 B2

POLYAMIDE RESIN COMPOSITION WITH EXCELLENT COLOR TONE

TECHNICAL FIELD

This disclosure relates to a polyamide resin composition with excellent color tone.

BACKGROUND

With increasing awareness of environmental issues, environmentally-friendly polymers using biomass-derived materials have been developed actively in recent years.

As an example of the development an environmentally-friendly polymer using 1,5-pentanediamine produced from biomass-derived material as a monomer component, addition of a flame retardant to polypentamethylene adipamide (hereinafter referred to as nylon 56) resin is disclosed in JP 2011-52034 A. Further, JP 2011-202103 A discloses that a polyamide having lower water absorption, and higher heat resistance, toughness, and moldability than those of conventional polyamides can be obtained by producing the polyamide using 1,5-pentanediamine with a low content of amino group-containing six-membered ring compounds, which are by-products of raw material preparation.

Japanese Patent No. 2911607 discloses a method regarding a polyamide which is light stabilized and heat stabilized by adding a triacetonediamine compound to a polyamide such as nylon 6, nylon 66, nylon 46, or nylon 610.

JP 2009-531505 W discloses a method of stabilizing a polymer by adding a hindered amine-based heat stabilizer having a piperidine structure to a polyamide such as poly-2,4,4-trimethylhexamethylene terephthalamide, poly-m-phenylene isophthal-amide, polyamide 66, polyamide 46, polyamide 610, polyamide 69, polyamide 612, polyamide 46, or polyamide 1212.

Polyamide resins containing 1,5-pentanediamine, in particular, polyamide resins using 1,5-pentanediamine produced from biomass-derived material as a monomer component tend to cause coloration upon heating, and in the prior art, a polymer satisfactory in color tone of a polyamide resin composition containing 1,5-pentanediamine could not be obtained.

In other words, the polyamide resins using 1,5-pentanediamine as described in JP 2011-52034 A and JP 2011-202103 A have a problem in that they tend to cause coloration upon heating, and a polyamide with excellent whiteness such as polyhexamethylene adipamide (hereinafter referred to as nylon 66) or polycapramide (hereinafter referred to as nylon 6) widely used at present as a general-purpose nylon may not be provided. Further, Japanese Patent No. 2911607 and JP 2009-531505 W are silent about the above-described problem of coloration specific to polyamide resins using 1,5-pentanediamine and a solution thereto.

Thus, it could be helpful to provide a polyamide resin composition with excellent color tone comprising a polyamide resin containing 1,5-pentanediamine and a heat stabilizer.

SUMMARY

We thus provide:

(1) A polyamide resin composition, comprising:
(a) a polyamide composed mainly of a polyamide backbone composed of diamine units composed mainly of 1,5-pentanediamine and dicarboxylic acid units; and
(b) a compound with a molecular weight of 1,000 or less having a sterically hindered N atom and a nitrogen-containing functional group that can react with at least one of amino groups, carboxyl groups, and amide groups constituting the polyamide.

(2) The polyamide resin composition according to (1), wherein the compound (b) has a cyclic structure.

(3) The polyamide resin composition according to any one of (1) to (2), wherein the compound (b) has a 2,2,6,6-tetramethylpiperidine backbone in its molecule.

(4) The polyamide resin composition according to any one of (1) to (3), wherein the compound (b) is added in an amount of 0.01 to 5% by weight based on 100% by weight of the polyamide (a).

(5) The polyamide resin composition according to any one of (1) to (4), wherein the 1,5-pentanediamine is derived from biomass.

(6) The polyamide resin composition according to any one of (1) to (5), wherein the dicarboxylic acid units are adipic acid units and/or sebacic acid units.

(7) The polyamide resin composition according to any one of (1) to (6), wherein the compound (b) in (1) to (4) is N,N'-bis(formyl)-N,N'-bis(2,2,6,6-tetramethyl-4-piperidyl)-1,6-hexanediamine or 4-amino-2,2,6,6-tetramethylpiperidine.

A polyamide resin composition with excellent color tone comprising a polyamide resin containing 1,5-pentanediamine and a heat stabilizer can be provided.

DETAILED DESCRIPTION

Our compositions will now be described in detail.

We provide a polyamide resin composition comprising (a) a polyamide composed mainly of a polyamide backbone composed of diamine units composed mainly of 1,5-pentanediamine and dicarboxylic acid units, and (b) a compound with a molecular weight of 1,000 or less having a sterically hindered N atom and a nitrogen-containing functional group that can react with at least one of amino groups, carboxyl groups, and amide groups constituting the polyamide.

Examples of the polyamide (a) composed mainly of a polyamide backbone composed of diamine units composed mainly of 1,5-pentanediamine and dicarboxylic acid units include a polyamide in which 1,5-pentanediamine accounts for 80 mol % or more of repeating units of a diamine component constituting the polyamide. The polyamide may include less than 20 mol % of any other diamine component as long as the effects are not impaired, but the amount of 1,5-pentanediamine is more preferably 90 mol % or more, most preferably 95 mol % or more.

1,5-pentanediamine produced from a biomass-derived compound is synthesized from a biomass-derived compound such as glucose or lysine in a monomer synthesis process by enzyme reaction, yeast reaction, fermentation reaction, or the like. These methods are preferred because high-purity 1,5-pentanediamine with a low content of compounds such as 2,3,4,5-tetrahydropyridine and piperidine can be prepared, which results in a polyamide resin composition having high molten storage stability. Specifically, polyamide resin compositions obtained by polymerization using 1,5-pentanediamine, 1,5-pentanediamine adipate, or 1,5-pentanediamine sebacate are preferred, the compositions being disclosed in JP 2002-223771 A, JP 2004-000114 A, JP 2004-208646 A, JP 2004-290091 A, JP 2004-298034 A, JP 2002-223770 A, JP 2004-222569 A, and the like, and polymerization using 1,5-pentanediamine adipate or 1,5-pentanediamine sebacate is more preferred because a higher-purity raw material is easily obtained. For adipic acid, sebacic acid, and other diamine components and dicarboxylic acid components, those which are prepared by a conventionally known method may be used.

Examples of methods of determining if 1,5-pentanediamine is derived from biomass include measurement of the radiocarbon (C14) content. Details of the measurement method have been standardized in many countries (e.g., ASTM (American Society for Testing and Materials) and CEN (Comite Europeen de Normalisation)), and in the United States, ASTM-D6866 method has been presented as a standard for measuring biomass percentage.

This measurement method, which was originally a standard of radiocarbon dating in determining the age of fossils, has been already used for 60 years, and thus is a well-established method/technique. Currently, ASTM-D6866 is used also for the measurement of biomass percentage stipulated by JBPA and JORA.

Examples of dicarboxylic acids include, but are not limited to, aliphatic dicarboxylic acids such as oxalic acid, malonic acid, succinic acid, glutaric acid, pimelic acid, suberic acid, azelaic acid, sebacic acid, undecanedioic acid, dodecanedioic acid, brasylic acid, tetradecanedioic acid, pentadecanedioic acid, and octadecanedioic acid; and aromatic dicarboxylic acids such as cyclohexane dicarboxylic acid, phthalic acid, isophthalic acid, terephthalic acid, and naphthalenedicarboxylic acid, among which adipic acid and/or sebacic acid are suitably used.

The polyamide (a) composed mainly of a polyamide backbone composed of diamine units composed mainly of 1,5-pentanediamine and dicarboxylic acid units may include a polyamide backbone other than the polyamide backbone composed of diamine units composed mainly of 1,5-pentanediamine and dicarboxylic acid units as long as the effects are not impaired. In the other polyamide backbone, lactams, amino carboxylic acids, and any other copolymerizable monomers may be copolymerized as an amide unit in an amount of, for example, 20 mol % or less based on the total amide units, preferably 10 mol % or less, and more preferably 5 mol % or less. Examples of such monomers include lactams such as valerolactam, ε-caprolactam, enantholactam, capryllactam, undecalactam, and lauryllactam; and ω-amino acids such as 6-aminocaproic acid, 7-aminoheptanoic acid, 9-aminononanoic acid, and 11-aminoundecanoic acid, among which ε-caprolactam is preferred.

The polyamide preferably has a relative viscosity, as measured at 25° C. in a 98% sulfuric acid solution with a sample concentration of 0.01 g/mL, of 2.0 or more, more preferably 2.05 to 7.0, particularly preferably 2.1 to 6.5, and most preferably 2.15 to 6.0. When the relative viscosity is in this preferred range, mechanical properties are sufficiently exhibited, and it will not be difficult to perform molding because of too high a melt viscosity.

The compound (b) with a molecular weight of 1,000 or less having a sterically hindered N atom and a nitrogen-containing functional group that can react with at least one of amino groups, carboxyl groups, and amide groups constituting the polyamide is a compound with a structure having at least one N atom that is surrounded by bulky substituents and does not react with amino groups and/or carboxyl groups constituting the polyamide and, in addition, at least one nitrogen-containing functional group that can react with at least one of amino groups, carboxyl groups, and amide groups constituting the polyamide.

To produce the desired effects, the molecular weight of the compound (b) having a sterically hindered N atom and a nitrogen-containing functional group that can react with at least one of amino groups, carboxyl groups, and amide groups constituting the polyamide needs to be as low as 1,000 or less. The low molecular weight reduces structural hindrance, thus allowing for efficient and rapid reaction with the polyamide (a).

The molecular weight of the compound (b) is preferably 800 or less, more preferably 500 or less. In general, when the molecular weight is 100 or less, it is not easy to form a structure having a sterically hindered N atom and a nitrogen-containing functional group that can react with at least one of amino groups, carboxyl groups, and amide groups constituting the polyamide.

The compound (b) with a molecular weight of 1,000 or less having a sterically hindered N atom and a nitrogen-containing functional group that can react with at least one of amino groups, carboxyl groups, and amide groups constituting the polyamide preferably has a cyclic structure in terms of a polyamide resin composition with excellent color tone, and examples of the cyclic structure include a piperidine backbone, piperazine backbone, and triazine backbone. More preferably, the compound (b) is a compound having a 2,2,6,6-tetramethylpiperidine backbone in its molecule.

Specific examples thereof include N,N'-bis(formyl)-N,N'-bis(2,2,6,6-tetramethyl-4-piperidyl)-1,6-hexanediamine, 4-amino-2,2,6,6-tetramethylpiperidine, bis(9-oxyl-9-aza-8,8,10,10-tetramethyl-3-ethyl-1,5-dioxaspiro[5.5]-3-undecyl methyl)methyliminodiacetate, tris(2,2,6,6-tetramethyl-4-piperidyl)citrate, tris(1-oxyl-2,2,6,6-tetramethyl-4-piperidyl) nitrilotriacetate, tetra(1-oxyl-2,2,6,6-tetramethyl-4-piperidyl)-1,3-bis aminomethyl)cyclohexanetetraacetate, and 1,3 -benzoldicarboxamide-N,N'-bis(2,2,6,6-tetramethyl-4-piperidinyl).

The compound that produces the effects in the most favorable manner is N,N'-bis (formyl)-N,N'-bis(2,2,6,6-tetramethyl-4-piperidyl)-1,6-hexanediamine or 4-amino-2,2,6,6-tetramethylpiperidine.

To produce the desired effects efficiently and sufficiently, the compound (b) with a molecular weight of 1,000 or less is added preferably in an amount of 0.01 to 5% by weight based on 100% by weight of the polyamide composition, more preferably 0.05 to 0.3% by weight. When the amount of the compound (b) with a molecular weight of 1,000 or less is in this preferred range, a polyamide resin composition with excellent color tone can be easily obtained.

Further, the compound (b) with a molecular weight of 1,000 or less having a sterically hindered N atom and a nitrogen-containing functional group that can react with at least one of amino groups, carboxyl groups, and amide groups constituting the polyamide is specifically effective in improving color tone of the polyamide composed mainly of a polyamide backbone composed of diamine units composed mainly of 1,5-pentanediamine and dicarboxylic acid units, and using the compound (b) for nylon 6 or nylon 66 which is a general-purpose nylon produces only a small improving-effect.

The timing of the addition of the compound (b) with a molecular weight of 1,000 or less having a sterically hindered N atom and a nitrogen-containing functional group that can react with at least one of amino groups, carboxyl groups, and amide groups constituting the polyamide is not critical, and coloration of the polyamide upon heating can be inhibited after addition of the compound (b). For example, the compound (b) can be added before or during polycondensation of diamine units composed mainly of 1,5-pentanediamine and dicarboxylic acid units, or can be added by melt-mixing with a polyamide resin after polycondensation. The melt-mixing may be performed using an extruder. Further, the compound (b) can also be added by chip blending a master chip containing the compound or physically mixing with a pellet of the above-described polyamide resin composition, and then subjecting the resulting mixture to molding such as spinning, extrusion molding, or injection molding. However, preferred is addition before or during polycondensation of diamine units composed mainly of 1,5-pentanediamine and dicarboxylic acid units because the nitrogen-containing functional group that can react with at least one of amino groups, carboxyl groups, and amide groups constituting the polyamide in the compound can cause a reaction sufficiently and the coloration-inhibiting effect can be fully exerted.

Known terminal blocking agents can be further added to the polyamide component for molecular weight modification. A preferred terminal blocking agent is monocarboxylic acid. Other examples include acid anhydrides such as phthalic anhydride, monoisocyanates, mono-acid halides, monoesters, and monoalcohols. Any monocarboxylic acid can be used as a terminal blocking agent as long as it has reactivity with amino groups, and examples thereof include aliphatic monocarboxylic acids such as acetic acid, propionic acid, butyric acid, valeric acid, caproic acid, caprylic acid, lauric acid, tridecyl acid, myristic acid, palmitin acid, stearic acid, pivalic acid, and isobutyl acid; alicyclic monocarboxylic acids such as cyclohexanecarboxylic acid; and aromatic monocarboxylic acids such as benzoic acid, toluic acid, α-naphthalenecarboxylic acid, 1,3-naphthalenecarboxylic acid, methylnaphthalenecarboxylic acid, and phenylacetic acid. One or more of these monocarboxylic acids may be used.

The method of producing the polyamide resin is not critical, but a thermal polycondensation process is generally used in which, for example, a mixture of water and a salt of 1,5-pentanediamine and dicarboxylic acids such as adipic acid and/or sebacic acid is heated to promote dehydration reaction. After thermal polycondensation, solid phase polymerization can be performed to increase the molecular weight. The solid phase polymerization proceeds by heating in vacuum or an inert gas in a temperature range from 100° C. to the melting point, and can increase the molecular weight of the polyamide resin, which is not sufficient after thermal polycondensation.

Other additives may be added to the polyamide resin composition depending on the intended use as long as the desired effects are not impaired. The additives can be added during copolymerization of the polyamide, or can be added by melt-mixing with the polyamide resin composition. The melt-mixing may be performed using an extruder. Further, the additives can also be added by chip blending a master chip containing the additives or physically mixing with a pellet of the polyamide resin composition, and then subjecting the resulting mixture to molding such as spinning, extrusion molding, or injection molding.

Examples of such additives include antioxidants and heat stabilizers (e.g., hindered phenolic-, hydroquinone-, phosphite-based ones, substitution products thereof, halogenated copper, and iodine compounds), weathering agents (e.g., resorcinol-, salicylate-, benzotriazole-, benzophenone-, hindered amine-based ones), mold releasing agents and lubricants (e.g., aliphatic alcohol, aliphatic amide, aliphatic bisamide, bisurea, and polyethylene wax), pigments (e.g., titanium oxide, cadmium sulfide, phthalocyanine, and carbon black), dyes (e.g., nigrosine and aniline black); crystal nucleating agents (e.g., talc, silica, kaolin, and clay), plasticizers (e.g., octyl p-oxybenzoate and N-butyl benzenesulfoneamide), antistatic agents (e.g., quarternary ammonium salt type cationic antistatic agents, nonionic antistatic agents such as polyoxyethylene sorbitan monostearate, and betaine-based amphoteric antistatic agents), flame retardants (e.g., melamine cyanurate; hydroxides such as magnesium hydroxide and aluminum hydroxide; ammonium polyphosphate; and brominated polystyrene, brominated polyphenylene oxide, brominated polycarbonate, brominated epoxy resins, and combinations of these brominated flame retardants with antimony trioxide), fillers (e.g., particulate, fibrous, acicular, and plate-like fillers such as graphite, barium sulfate, magnesium sulfate, calcium carbonate, magnesium carbonate, antimony oxide, titanium oxide, aluminum oxide, zinc oxide, iron oxide, zinc sulfide, zinc, lead, nickel, aluminum, copper, iron, stainless steels, glass fibers, carbon fibers, aramid fibers, bentonite, montmorillonite, and synthetic mica), and other polymers (e.g., other polyamides, polyethylene, polypropylene, polyester, polycarbonate, polyphenylene ether, polyphenylene sulfide, liquid crystal polymer, polysulfone, polyethersulfone, ABS resin, SAN resin, and polystyrene).

The polyamide resin composition thus obtained has excellent color tone, and can have a low color tone YI compared to that of a polyamide (a) to which the compound (b) is not added (hereinafter referred to as an unadded polyamide). Preferably, the YI of the polyamide resin composition can be lower than the YI of an unadded polyamide by 1.5 or more but less than 3, and more preferably, the YI of the polyamide resin composition can be lower than the YI of an unadded polyamide by 3 or more.

The upper limit of the YI of the polyamide resin composition is about 20 or less. "YI value" as used herein refers to a value determined by the method mentioned below. Lower YIs indicate less coloration. Significant coloration limits the applicability and leads to a lowered product value, and thus the YI is preferably low.

Further, since the polyamide resin composition has excellent color tone, preferably, the polyamide resin composition comprising, for example, nylon 56 as a polyamide can achieve a color tone YI of 4.8 or less, and more preferably, can achieve even 3.3 or less. The lower limit of the color tone YI of nylon 56 is about −15. Similarly in the case of nylon 510, a color tone YI of 0.8 or less can be achieved, and in a more preferred aspect, a color tone YI of -0.7 or less can be achieved. The lower limit of the color tone YI of nylon 510 is about −20.

EXAMPLES

Our compositions will now be described in more detail with reference to examples, but this disclosure is not limited to the description of these examples.

Sulfuric Acid Relative Viscosity ($\eta_r$)

A sample in an amount of 0.25 g was dissolved in 100 ml of sulfuric acid at a concentration of 98 wt %, and the time of flow at 25° C. (T1) was measured using an Ostwald viscometer. Subsequently, the time of flow of sulfuric acid at a concentration of 98wt % alone (T2) was measured. The ratio of T1 to T2, i.e., T1/T2 was used as a sulfuric acid relative viscosity.

Amino Group Content

A sample in an amount of 1 g was dissolved in 50 mL of phenol/ethanol mixed solution (phenol/ethanol=80/20) with shaking at 30° C., and the resulting solution was neutralized and titrated with 0.02N hydrochloric acid. The amount of 0.02N hydrochloric acid required was determined. Further, the phenol/ethanol mixed solvent alone (in the same amount as above) was neutralized and titrated with 0.02N hydrochloric acid, and the amount of 0.02N hydrochloric acid required was determined. From the difference between the two amounts, the amino group content per 1 g of the sample was determined.

Melting Point (Tm)

On a differential thermal analysis curve obtained by measuring 10 mg of a sample using a differential scanning calorimeter (PerkinElmer, DSC-7) at a temperature rise rate of 15° C./min, a peak showing an extreme value on the endothermic side was determined as a melting peak, and a temperature giving the extreme value was used as a melting point Tm (° C.). When there are several extreme values, an extreme value on the higher temperature side was used as a melting point.

Yellowness Index (YI)

The YI value of pellets was measured using Colour Meter (Suga Test Instruments Co., Ltd) according to JIS K 7105 (Testing methods for optical properties of plastics).

In the Examples and Comparative Examples, the YI of the polyamide resin compositions obtained in Examples and Comparative Examples was compared to the YI of an unadded polyamide; the lowering by 3 or more was evaluated as excellent, the lowering by 1.5 or more but less than 3 as good, and the lowering by less than 1.5 as bad.

Reference Example 1

(Preparation of Lysine Decarboxylase)

E. coli JM109 was cultured as follows: first, a biomass-loopful of this strain was inoculated in 5 ml of LB medium, and shaken at 30° C. for 24 hours for preculture.

Next, 50 ml of the LB medium was placed in a 500 ml Erlenmeyer flask and steam-sterilized at 115° C. for 10 minutes for pretreatment. The precultured strain was transferred to this medium and cultured for 24 hours under the conditions of an amplitude of 30 cm and 180 rpm while adjusting the pH to 6.0 with a 1N aqueous hydrochloric acid solution. Fungus bodies thus obtained were collected, and a cell-free extract was prepared by sonication and centrifugation. The lysine decarboxylase activity was measured according to a conventional method (Kenji Soda and Haruo Misono, Seikagaku Jikken Koza, vol. 11, first volume, pp. 179-191 (1976)).

The use of lysine as a substrate can cause conversion through lysine monooxygenase, lysine oxidase, and lysine mutase, which is considered to be the original main route, and therefore the cell-free extract of E. coli JM109 was heated at 75° C. for 5 minutes to block this reaction system. Further, the cell-free extract was fractionated with 40% saturated and 55% saturated ammonium sulfate. The partially purified lysine decarboxylase solution thus obtained was used to produce 1,5-pentanediamine from lysine.

Reference Example 2

(Production of 1,5-pentanediamine)

An aqueous solution containing 50 mM lysine hydrochloride (available from Wako Pure Chemical Industries, Ltd.), 0.1 mM pyridoxal phosphoric acid (available from Wako Pure Chemical Industries, Ltd.), and 40 mg/L of partially purified lysine decarboxylase (prepared in Reference Example 1) was prepared, and 1,000 ml of the solution was allowed to react at 45° C. for 48 hours while maintaining the pH at 5.5 to 6.5 with a 0.1N aqueous hydrochloric acid solution to obtain 1,5-pentanediamine hydrochloride. Sodium hydroxide was added to this aqueous solution to convert 1,5-pentanediamine hydrochloride to 1,5-pentanediamine, which was extracted with chloroform and distilled under reduced pressure (1,066.58 Pa, 70° C.) to obtain 1,5-pentanediamine.

Reference Example 3

(Preparation of 50 wt % Aqueous Solution of 1,5-pentamethylenediamine adipate)

An aqueous solution obtained by dissolving 576.4 g of 1,5-pentamethylenediamine prepared in Reference Example 2 in 1,400 g of ion exchanged water was immersed in an ice bath, and while stirring the solution, 823.6 g of adipic acid (available from Cahc Co., Ltd) was added portion-wise. Upon nearing the point of neutralization, the solution was warmed in a water bath at 40° C. to an inner temperature of 33° C. to prepare 2,800 g of a 50% by weight aqueous solution of 1,5-pentamethylenediamine adipate with a pH of 8.32.

Reference Example 4

(Preparation of 40 wt % aqueous solution of 1,5-pentamethylenediamine sebacate)

An aqueous solution obtained by dissolving 469.9 g of 1,5-pentamethylenediamine prepared in Reference Example 2 in 2,100 g of ion exchanged water was immersed in an ice bath, and while stirring the solution, 930.1 g of sebacic acid (available from Cahc Co., Ltd) was added portion-wise. Upon nearing the point of neutralization, the solution was warmed in a water bath at 40° C. to an inner temperature of 33° C. to prepare 3,500 g of a 40% by weight aqueous solution of 1,5-pentamethylenediamine sebacate with a pH of 7.80.

Example 1

The 50 wt % aqueous solution of 1,5-pentamethylenediamine adipate prepared in Reference Example 3 and a compound (b) N,N'-bis(formyl)-N,N'-bis(2,2,6,6-tetramethyl-4-piperidyl)-1,6-hexanediamine ("Uvinul" (registered trademark) 4050 FF, available from BASF SE) in the amount shown in Table 1 were charged into a batch polymerization tank having an internal volume of 5 L equipped with a stirrer having a helical ribbon impeller and a heating medium jacket (raw material preparation step).

The polymerization tank was then hermetically sealed and thoroughly purged with nitrogen, after which the heating medium was heated to concentrate the aqueous solution (concentration step). In this step, the aqueous solution was concentrated until the concentration of the raw material in the aqueous solution reached 85 wt % while controlling the internal temperature at 200° C. and the internal pressure (gauge pressure) at 0.2 MPa. The concentration of the aqueous solution in the tank was determined from the amount of water distilled.

Upon completion of the concentration, the heating medium temperature was raised to 290° C., and the pressure increased until the internal pressure (gauge pressure) reached 1.7 MPa (pressure increasing step). Thereafter, the internal pressure (gauge pressure) was controlled at 1.7 MPa and maintained there until the internal temperature reached 255° C. (pressure controlling step). Further, the heating medium temperature was changed to 286.5° C., and the pressure released to atmospheric pressure over 50 minutes (pressure releasing step). Further, the internal pressure (gauge pressure) was reduced to −13 kPa and maintained there for 30 minutes to terminate the polymerization reaction (pressure reducing step). Thereafter, a nitrogen pressure of 0.5 MPa (absolute pressure) was applied to the inside of the tank to extrude the polyamide resin composition produced by polymerization into a strand with a diameter of about 3 mm, and the extrudate was cut to a length of about 4 mm to obtain pellets (discharging step). The polyamide resin composition produced had a sulfuric acid relative viscosity ($\eta r$) of 2.68, an amino end group content of $5.73 \times 10^{-5}$ mol/g, and a Tm of 254° C.

Examples 2 to 6

In the raw material preparation step shown in Example 1, a heat stabilizer N,N'-bis (formyl)-N,N'-bis(2,2,6,6-tetramethyl-4-piperidyl)-1,6-hexanediamine ("Uvinul" (registered trademark) 4050 FF, available from BASF SE) was charged into the same polymerization tank in the amounts shown in Table 1. Thereafter, the same procedure as in Example 1 was repeated to produce a polyamide resin composition.

Examples 7 to 12

In place of the heat stabilizer used in the raw material preparation step shown in Example 1, 4-amino-2,2,6,6-tetramethylpiperidine (trade name: triacetonediamine, available from Degussa Hüls AG) was charged into the same polymerization tank in the amounts shown in Table 1. Thereafter, the same procedure as in Example 1 was repeated to produce a polyamide resin composition.

Example 13

The 40 wt % aqueous solution of 1,5-pentamethylenediamine sebacate prepared in Reference Example 3 and a heat stabilizer N,N'-bis(formyl)-N,N'-bis(2,2,6,6-tetramethyl-4-piperidyl)-1,6-hexanediamine ("Uvinul" (registered trademark) 4050 FF, available from BASF SE) in the amount shown in Table 1 were charged into a batch polymerization tank having an internal volume of 5 L equipped with a stirrer having a helical ribbon impeller and a heating medium jacket (raw material preparation step).

The polymerization tank was then hermetically sealed and thoroughly purged with nitrogen, after which the heating medium was heated to concentrate the aqueous solution (concentration step). In this step, the aqueous solution was concentrated until the concentration of the raw material in the aqueous solution reached 85 wt % while controlling the internal temperature at 200° C. and the internal pressure (gauge pressure) at 0.2 MPa. The concentration of the aqueous solution in the tank was determined from the amount of water distilled.

Upon completion of the concentration, the heating medium temperature was raised to 280° C., and the pressure increased until the internal pressure (gauge pressure) reached 1.7 MPa (pressure increasing step). Thereafter, the internal pressure (gauge pressure) was controlled at 1.7 MPa and maintained there until the internal temperature reached 255° C. (pressure controlling step). Further, the heating medium temperature was changed to 275° C., and the pressure released to atmospheric pressure over 50 minutes (pressure releasing step). Further, the internal pressure (gauge pressure) was reduced to −29 kPa and maintained there for 30 minutes to terminate the polymerization reaction (pressure reducing step). Thereafter, a nitrogen pressure of 0.5 MPa (absolute pressure) was applied to the inside of the tank to extrude the polyamide resin composition produced by polymerization into a strand with a diameter of about 3 mm, and the extrudate cut to a length of about 4 mm to obtain pellets (discharging step). The polyamide resin composition produced had a sulfuric acid relative viscosity ($\eta r$) of 2.60, an amino end group content of $4.41 \times 10^{-5}$ mol/g, and a Tm of 215° C.

Example 14

In place of the heat stabilizer used in the raw material preparation step shown in Example 13, 4-amino-2,2,6,6-tetramethylpiperidine (trade name: triacetonediamine, available from Degussa Hüls AG) was charged into the same polymerization tank in the amount shown in Table 1. Thereafter, the same procedure as in Example 13 was repeated to produce a polyamide resin composition.

Example 15

In the raw material preparation step shown in Example 1, 1,5-pentamethylenediamine adipate and an adipic acid/hexamethylenediamine salt were charged such that the polymer composition ratio (N56/N66) was 95:5, and a heat stabilizer N,N'-bis(formyl)-N,N'-bis(2,2,6,6-tetramethyl-4-piperidyl)-1,6-hexanediamine ("Uvinul" (registered trademark) 4050 FF, available from BASF SE) was charged into the same polymerization tank in the amount shown in Table 1. Thereafter, the same procedure as in Example 1 was repeated to produce a polyamide resin composition.

Example 16

In the raw material preparation step shown in Example 1, 1,5-pentamethylenediamine adipate and an adipic acid/hexamethylenediamine salt were charged such that the polymer composition ratio (N56/N66) was 95:5, and 4-amino-2,2,6,6-tetramethylpiperidine (trade name: triacetonediamine, available from Degussa Hüls AG) was charged into the same polymerization tank in the amount shown in Table 1. Thereafter, the same procedure as in Example 1 was repeated to produce a polyamide resin composition.

Example 17

In the raw material preparation step shown in Example 1, 1,5-pentamethylenediamine adipate and ε-caprolactam were charged such that the polymer composition ratio (N56/N6) was 95:5, and a heat stabilizer N,N'-bis(formyl)-N,N'-bis(2,2,6,6-tetramethyl-4-piperidyl)-1,6-hexanediamine ("Uvinul" (registered trademark) 4050 FF, available from BASF SE) was charged into the same polymerization tank in the amount shown in Table 1. Thereafter, the same procedure as in Example 1 was repeated to produce a polyamide resin composition.

Example 18

In the raw material preparation step shown in Example 1, 1,5-pentamethylenediamine adipate and c-caprolactam were charged such that the polymer composition ratio (N56/N6) was 95:5, and 4-amino-2,2,6,6-tetramethylpiperidine (trade name: triacetonediamine, available from Degussa Hüls AG) was charged into the same polymerization tank in the amount shown in Table 1. Thereafter, the same procedure as in Example 1 was repeated to produce a polyamide resin composition.

Example 19

In the raw material preparation step shown in Example 13, 1,5-pentamethylenediamine sebacate and an adipic acid/hexamethylenediamine salt were charged such that the polymer composition ratio (N510/N66) was 95:5, and a heat stabilizer N,N'-bis(formyl)-N,N'-bis(2,2,6,6-tetramethyl-4-piperidyl)-1,6-hexanediamine ("Uvinul" (registered trademark) 4050 FF, available from BASF SE) was charged into the same polymerization tank in the amount shown in Table 1. Thereafter, the same procedure as in Example 1 was repeated to produce a polyamide resin composition.

Example 20

In the raw material preparation step shown in Example 13, 1,5-pentamethylenediamine sebacate and an adipic acid/hexamethylenediamine salt were charged such that the polymer composition ratio (N510/N66) was 95:5, and 4-amino-2,2,6,6-tetramethylpiperidine (trade name: triacetonediamine, available from Degussa Hüls AG) was charged into the same polymerization tank in the amount shown in Table 1. Thereafter, the same procedure as in Example 1 was repeated to produce a polyamide resin composition.

Example 21

In the raw material preparation step shown in Example 13, 1,5-pentamethylenediamine sebacate and ε-caprolactam were charged such that the polymer composition ratio (N510/N6) was 95:5, and a heat stabilizer N,N'-bis(formyl)-N,N'-bis(2,2,6,6-tetramethyl-4-piperidyl)-1,6-hexanediamine ("Uvinul" (registered trademark) 4050 FF, available from BASF SE) was charged into the same polymerization tank in the amount shown in Table 1. Thereafter, the same procedure as in Example 1 was repeated to produce a polyamide resin composition.

Example 22

In the raw material preparation step shown in Example 13, 1,5-pentamethylenediamine sebacate and ε-caprolactam were charged such that the polymer composition ratio (N510/N6) was 95:5, and 4-amino-2,2,6,6-tetramethylpiperidine (trade name: triacetonediamine, available from Degussa Hüls AG) was charged into the same polymerization tank in the amount shown in Table 1. Thereafter, the same procedure as in Example 1 was repeated to produce a polyamide resin composition. The composition and properties of the polyamide resin compositions produced in Examples 1 to 22 are shown in Table 1 and Table 2. In Table 1 and Table 2, the compound name of the hindered amine-based heat stabilizer (1) ("Uvinul" (registered trademark) 4050 FF) is N,N'-bis(formyl)-N,N'-bis(2,2,6,6-tetramethyl-4-piperidyl)-1,6-hexanediamine, and the compound name of the hindered amine-based heat stabilizer (2) (trade name: "TAD") is 4-amino-2,2,6,6-tetramethylpiperidine.

TABLE 1

| | | | Examples | | | | | |
|---|---|---|---|---|---|---|---|---|
| | | | 1 | 2 | 3 | 4 | 5 | 6 |
| Polyamides | Nylon 56 | | ○ | ○ | ○ | ○ | ○ | ○ |
| | Nylon 510 | | | | | | | |
| | Nylon 56/Nylon 66 | | | | | | | |
| | Nylon 56/Nylon 6 | | | | | | | |
| | Nylon 510/Nylon 66 | | | | | | | |
| | Nylon 510/Nylon 6 | | | | | | | |
| Heat-resistant agent | Hindered amine (1) ("Uvinul" 4050 FF) molecular weight: 450 | Parts by weight (to polymer) | 0.01 | 0.05 | 0.10 | 0.20 | 0.30 | 5.00 |
| | Hindered amine (2) (TAD) molecular weight: 156 | Parts by weight (to polymer) | | | | | | |
| Sulfric acid relative viscosity [ηr] | | [—] | 2.68 | 2.68 | 2.62 | 2.56 | 2.59 | 2.57 |
| Amino group content | | [×10$^{-5}$ mol/g] | 5.73 | 5.88 | 5.29 | 6.16 | 6.80 | 7.01 |
| Melting point | | [° C.] | 254 | 253 | 253 | 254 | 255 | 254 |
| Yellowness index of pellets [YI] | | [—] | 4.0 | 3.1 | 3.2 | 2.4 | 3.0 | 3.9 |
| Evaluation standard | YI of Example - YI of unadded polyaimde | | -2.3 | -3.2 | -3.1 | -3.9 | -3.3 | -2.4 |
| | Evaluation of yellowness index of pellets | [—] | good | excellent | excellent | excellent | excellent | good |

| | | | Examples | | | | |
|---|---|---|---|---|---|---|---|
| | | | 7 | 8 | 9 | 10 | 11 |
| Polyamides | Nylon 56 | | ○ | ○ | ○ | ○ | ○ |
| | Nylon 510 | | | | | | |
| | Nylon 56/Nylon 66 | | | | | | |
| | Nylon 56/Nylon 6 | | | | | | |
| | Nylon 510/Nylon 66 | | | | | | |
| | Nylon 510/Nylon 6 | | | | | | |
| Heat-resistant agent | Hindered amine (1) ("Uvinul" 4050 FF) molecular weight: 450 | Parts by weight (to polymer) | | | | | |
| | Hindered amine (2) (TAD) molecular weight: 156 | Parts by weight (to polymer) | 0.01 | 0.05 | 0.10 | 0.20 | 0.30 |
| Sulfric acid relative viscosity [ηr] | | [—] | 2.85 | 2.90 | 2.87 | 2.65 | 2.55 |
| Amino group content | | [×10$^{-5}$ mol/g] | 5.65 | 5.65 | 5.75 | 5.90 | 6.27 |
| Melting point | | [° C.] | 255 | 255 | 254 | 255 | 253 |
| Yellowness index of pellets [YI] | | [—] | 4.1 | 3.0 | 2.9 | 2.8 | 3.3 |
| Evaluation standard | YI of Example - YI of unadded polyaimde | | -2.2 | -3.3 | -3.4 | -3.5 | -3.0 |
| | Evaluation of yellowness index of pellets | [—] | good | excellent | excellent | excellent | excellent |

TABLE 2

| | | | Examples | | | | | |
|---|---|---|---|---|---|---|---|---|
| | | | 12 | 13 | 14 | 15 | 16 | 17 |
| Polyamides | Nylon 56 | | ○ | | | | | |
| | Nylon 510 | | | ○ | ○ | | | |
| | Nylon 56/Nylon 66 | | | | | ○ | | |
| | Nylon 56/Nylon 6 | | | | | | ○ | |
| | Nylon 510/Nylon 66 | | | | | | | ○ |
| | Nylon 510/Nylon 6 | | | | | | | |
| Heat-resistant agent | Hindered amine (1) ("Uvinul" 4050 FF) molecular weight: 450 | Parts by weight (to polymer) | | 0.20 | | 0.20 | | 0.20 |
| | Hindered amine (2) (TAD) molecular weight: 156 | Parts by weight (to polymer) | 5.00 | | 0.20 | | 0.20 | |
| | Sulfric acid relative viscosity [ηr] | [—] | 2.59 | 2.60 | 2.70 | 2.78 | 2.81 | 2.90 |
| | Amino group content | [×10$^{-5}$ mol/g] | 6.53 | 4.41 | 4.25 | 6.27 | 6.03 | 5.89 |
| | Melting point | [° C.] | 254 | 215 | 214 | 255 | 254 | 250 |
| | Yellowness index of pellets [YI] | [—] | 4.1 | −1.2 | −0.9 | 3.0 | 2.7 | 3.1 |
| Evaluation standard | YI of Example - YI of unadded polyaimde | | −2.2 | −3.5 | −3.2 | −3.1 | −3.4 | −3.2 |
| | Evaluation of yellowness index of pellets | [—] | good | excellent | excellent | excellent | excellent | excellent |

| | | | Examples | | | | |
|---|---|---|---|---|---|---|---|
| | | | 18 | 19 | 20 | 21 | 22 |
| Polyamides | Nylon 56 | | | | | | |
| | Nylon 510 | | | | | | |
| | Nylon 56/Nylon 66 | | | | | | |
| | Nylon 56/Nylon 6 | | ○ | | | | |
| | Nylon 510/Nylon 66 | | | ○ | ○ | | |
| | Nylon 510/Nylon 6 | | | | | ○ | ○ |
| Heat-resistant agent | Hindered amine (1) ("Uvinul" 4050 FF) molecular weight: 450 | Parts by weight (to polymer) | | 0.20 | | 0.20 | |
| | Hindered amine (2) (TAD) molecular weight: 156 | Parts by weight (to polymer) | 0.20 | | 0.20 | | 0.20 |
| | Sulfric acid relative viscosity [ηr] | [—] | 2.88 | 2.77 | 2.64 | 2.59 | 2.69 |
| | Amino group content | [×10$^{-5}$ mol/g] | 5.77 | 4.56 | 4.39 | 4.32 | 4.45 |
| | Melting point | [° C.] | 249 | 216 | 215 | 210 | 211 |
| | Yellowness index of pellets [YI] | [—] | 3.3 | −0.6 | −0.5 | −0.3 | −0.5 |
| Evaluation standard | YI of Example - YI of unadded polyaimde | | −3.1 | −3.0 | −3.0 | −3.0 | −3.2 |
| | Evaluation of yellowness index of pellets | [—] | excellent | excellent | excellent | excellent | excellent |

Comparative Example 1

In the raw material preparation step shown in Example 1, a heat stabilizer N,N'-bis (formyl)-N,N'-bis(2,2,6,6-tetramethyl-4-piperidyl)-1,6-hexanediamine ("Uvinul" (registered trademark) 4050 FF, available from BASF SE) was not added in charging into the same polymerization tank, Thereafter, the same procedure as in Example 1 was repeated to produce a polyamide resin composition, Comparative Examples 2 to 6

In the raw material preparation step shown in Example 1, a heat stabilizer, the type and amount of which were varied as shown in Table 2, was charged into the same polymerization tank. Thereafter, the same procedure as in Example 1 was repeated to produce a polyamide resin composition.

Comparative Example 7

In the raw material preparation step shown in Example 13, a heat stabilizer, the type and amount of which are as shown in Table 2, was charged into the same polymerization tank, Thereafter, the same procedure as in Example 13 was repeated to produce a polyamide resin composition.

Comparative Example 8

In the raw material preparation step shown in Example 1, 1,5-pentamethylenediamine adipate and an adipic acid/hexamethylenediamine salt were charged such that the polymer composition ratio (N56/N66) was 95:5, and a heat stabilizer, the type and amount of which are as shown in Table 2, was charged into the same polymerization tank. Thereafter, the same procedure as in Example 1 was repeated to produce a polyamide resin composition.

Comparative Example 9

In the raw material preparation step shown in Example 1, 1,5-pentamethylenediamine adipate and c-caprolactam were charged such that the polymer composition ratio (N56/N6) was 95:5, and a heat stabilizer, the type and amount of which are as shown in Table 2, was charged into the same polymerization tank. Thereafter, the same procedure as in Example I was repeated to produce a polyamide resin composition.

Comparative Example 10

In the raw material preparation step shown in Example 13, 1,5-pentamethylenediamine sebacate and an adipic acid/hexamethylenediamine salt were charged such that the polymer composition ratio (N510/N66) was 95:5, a heat stabilizer, the type and amount of which are as shown in Table 2, was charged into the same polymerization tank.

Thereafter, the same procedure as in Example 11 was repeated to produce a polyamide resin composition.

Comparative Example 11

In the raw material preparation step shown in Example 13, 1,5-pentamethylenediamine sebacate and ε-caprolactam were charged such that the polymer composition ratio (N510/N6) was 95:5, a heat stabilizer, the type and amount of which are as shown in Table 2, was charged into the same polymerization tank. Thereafter, the same procedure as in Example 13 was repeated to produce a polyamide resin composition.

Comparative Examples 12 to 14

A 53% by weight aqueous solution of an adipic acid/hexamethylenediamine salt and a heat stabilizer in the amounts shown in Table 2 were charged into a batch polymerization tank having an internal volume of 5 L equipped with a stirrer having a helical ribbon impeller and a heating medium jacket (raw material preparation step).

The polymerization tank was then hermetically sealed and thoroughly purged with nitrogen, after which the heating medium was heated to concentrate the aqueous solution (concentration step). In this step, the aqueous solution was concentrated until the concentration of the raw material in the aqueous solution reached 85 wt % while controlling the internal temperature at 200° C. and the internal pressure (gauge pressure) at 0.2 MPa. The concentration of the aqueous solution in the tank was determined from the amount of water distilled.

Upon completion of the concentration, the heating medium temperature was raised to 290° C., and the pressure increased until the internal pressure (gauge pressure) reached 1.7 MPa (pressure increasing step), Thereafter, the internal pressure (gauge pressure) was controlled at 1.7 MPa and maintained there until the internal temperature reached 255° C. (pressure controlling step). Further, the heating medium temperature was changed to 285° C., and the pressure released to atmospheric pressure over 50 minutes (pressure releasing step). Further, the internal pressure (gauge pressure) was reduced to −13 kPa and maintained there for 30 minutes to terminate the polymerization reaction (pressure reducing step). Thereafter, a nitrogen pressure of 0.5 MPa (absolute pressure) was applied to the inside of the tank to extrude the polyamide resin composition produced by polymerization into a strand with a diameter of about 3 mm, and the extrudate cut to a length of about 4 mm to obtain pellets (discharging step).

Comparative Examples 15 to 17

A 94% by weight aqueous solution of ε-caprolactam and a heat stabilizer in the amounts shown in Table 2 were charged into a batch polymerization tank having an internal volume of 5 L equipped with a stirrer having a helical ribbon impeller and a heating medium jacket (raw material preparation step).

The polymerization tank was then hermetically sealed and thoroughly purged with nitrogen, after which the heating medium temperature was raised to 265° C., and the pressure increased until the internal pressure (gauge pressure) reached 1.0 MPa (pressure increasing step), Thereafter, the internal pressure (gauge pressure) was controlled at 1.0 MPa and maintained there until the internal temperature reached 255° C. (pressure controlling step), Further, the heating medium temperature was changed to 255° C., and the pressure released to atmospheric pressure over 40 minutes (pressure releasing step), Further, the internal pressure (gauge pressure) was maintained at normal pressure for 90 minutes to terminate the polymerization reaction (normal pressure step), Thereafter, a nitrogen pressure of 0.5 MPa (absolute pressure) was applied to the inside of the tank to extrude the polyamide resin composition produced by polymerization into a strand with a diameter of about 3 mm, and the extrudate cut to a length of about 4 mm to obtain pellets (discharging step). The composition and properties of the polyamide resin compositions produced in Comparative Examples 1 to 17 are shown in Table 3 and Table 4, In Table 3 and Table 4, the compound name of the hindered amine-based heat stabilizer (1) ("Uvinul" (registered trademark) 4050 FF) is N,N'-bis (formyl)-N,N'-bis(2,2,6,6-tetramethyl-4-piperidyl)-1,6-hexanediamine; the compound name of the hindered amine-based heat stabilizer (2) (trade name: TAD) is 4-amino-2,2, 6,6-tetramethylpiperidine; the compound name of the hindered amine-based heat stabilizer (3) ("TINUVIN" (registered trademark) 770) is bis(2,2,6,6-tetramethyl-4-piperidyl) psebacate; the compound name of the hindered amine-based heat stabilizer (4) ("TINUVIN" (registered trademark) 144) is bis(1,2,2,6,6-pentamethyl-4-piperidinyl)[[3,5-bis (1,1-dimethylethyl)-4-hydroxyphenyl]methyl]butylmalonate; the compound name of the hindered amine-based heat stabilizer (5) ("TINUVIN" (registered trademark) 765) is bis(1,2,2,6,6-pentamethyl-4-piperidinyl)sebacate; the compound name of the hindered amine-based heat stabilizer (6) is N,N',N'',N'''-tetrakis-(4,6-bis-(butyl-N(-methyl-2,2,6,6-tetramethylpiperidin-4-yl)amino)-triazin-2-yl)-4,7-diazadecane-1,10-diamine; and the compound name of the hindered phenol heat stabilizer ("Irganox" (registered trademark) 1330) is 3,3',3'',5,5',5''-hexa-tert-butyl-a,a',a''-(mesitylene-2, 4,6-triyl)tri-p-cresol.

TABLE 3

| | | Comparatve Examples | | | | | | | | |
|---|---|---|---|---|---|---|---|---|---|---|
| | | 1 | 2 | 3 | 4 | 5 | 6 | 7 | 8 | 9 |
| Polyamides | Nylon 56 | ○ | ○ | ○ | ○ | ○ | ○ | | | |
| | Nylon 510 | | | | | | | ○ | | |
| | Nylon 56/Nylon 66 | | | | | | | | ○ | |
| | Nylon 56/Nylon 6 | | | | | | | | | ○ |
| | Nylon 510/Nylon 66 | | | | | | | | | |
| | Nylon 510/Nylon 6 | | | | | | | | | |
| | Nylon 66 | | | | | | | | | |
| | Nylon 6 | | | | | | | | | |

TABLE 3-continued

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Heat-resistant agent | Hindered amine (1) ("Uvinul" 4050 FF) molecular weight: 450 | Parts by weight (to polymer) | | | | | | | | | |
| | Hindered amine (2) (TAD) molecular weight: 156 | Parts by weight (to polymer) | | | | | | | | | |
| | Hindered amine (3) ("TINUVIN" 770) molecular weight: 480 | Parts by weight (to polymer) | | 0.20 | | | | | | | |
| | Hindered amine (4) ("TINUVIN" 144) molecular weight: 685 | Parts by weight (to polymer) | | | 0.20 | | | | | | |
| | Hindered amine (5) ("TINUVIN" 765) molecular weight: 509 | Parts by weight (to polymer) | | | | 0.20 | | | | | |
| | Hindered amine (6) molecular weight: 1896 | Parts by weight (to polymer) | | | | | 0.20 | | | | |
| | Hindered phenol ("Irganox" 1330) molecular weight: 775 | Parts by weight (to polymer) | | | | | | 0.20 | | | |
| | Sulfric acid relatve viscosity [ηr] | [—] | 2.66 | 2.68 | 2.63 | 2.64 | 2.66 | 2.65 | 2.56 | 2.87 | 2.53 |
| | Amino group content | [×10$^{-5}$ mol/g] | 6.16 | 7.10 | 7.46 | 7.38 | 6.82 | 7.92 | 4.53 | 5.76 | 5.61 |
| | Melting point | [° C.] | 254 | 255 | 253 | 256 | 254 | 254 | 214 | 254 | 249 |
| | Yellowness index of pellets [YI] | [—] | 6.3 | 6.0 | 8.9 | 7.4 | 7.2 | 11.4 | 2.3 | 6.1 | 6.5 |
| Evaluation standard | YI of Example - YI of unadded polyaimde | | 0.0 | -0.3 | 2.6 | 1.1 | 0.9 | 5.1 | 0.0 | 0.0 | 0.0 |
| | Evaluation of yellowness index of pellets | [—] | — | bad | bad | bad | bad | bad | — | — | — |

TABLE 4

| | | | Comparative Examples | | | | | | | |
|---|---|---|---|---|---|---|---|---|---|---|
| | | | 10 | 11 | 12 | 13 | 14 | 15 | 16 | 17 |
| Polyamides | Nylon 56 | | | | | | | | | |
| | Nylon 510 | | | | | | | | | |
| | Nylon 56/Nylon 66 | | | | | | | | | |
| | Nylon 56/Nylon 6 | | | | | | | | | |
| | Nylon 510/Nylon 66 | | ○ | | | | | | | |
| | Nylon 510/Nylon 6 | | | ○ | | | | | | |
| | Nylon 66 | | | | ○ | ○ | ○ | | | |
| | Nylon 6 | | | | | | | ○ | ○ | ○ |
| Heat-resistant agent | Hindered amine (1) ("Uvinul" 4050 FF) molecular weight: 450 | Parts by weight (to polymer) | | | | 0.20 | | | 0.20 | |
| | Hindered amine (2) (TAD) molecular weight: 156 | Parts by weight (to polymer) | | | | | 0.20 | | | 0.20 |
| | Hindered amine (3) ("TINUVIN" 770) molecular weight: 480 | Parts by weight (to polymer) | | | | | | | | |
| | Hindered amine (4) ("TINUVIN" 144) molecular weight: 685 | Parts by weight (to polymer) | | | | | | | | |
| | Hindered amine (5) ("TINUVIN" 765) molecular weight: 509 | Parts by weight (to polymer) | | | | | | | | |
| | Hindered amine (6) molecular weight: 1896 | Parts by weight (to polymer) | | | | | | | | |
| | Hindered phenol ("Irganox" 1330) molecular weight: 775 | Parts by weight (to polymer) | | | | | | | | |
| | Sulfric acid relative viscosity [ηr] | [—] | 2.64 | 2.56 | 2.76 | 2.78 | 2.73 | 2.72 | 2.68 | 2.66 |
| | Amino group content | [×10$^{-5}$ mol/g] | 4.39 | 4.27 | 5.84 | 6.75 | 6.88 | 5.30 | 6.45 | 6.30 |
| | Melting point | [° C.] | 216 | 209 | 262 | 261 | 261 | 222 | 221 | 224 |
| | Yellowness index of pellets [YI] | [—] | 2.5 | 2.7 | 0.2 | -0.7 | -0.2 | -5.4 | -4.8 | -5.0 |
| Evaluation standard | YI of Example - YI of unadded polyaimde | | 0.0 | 0.0 | 0.0 | -0.9 | -0.4 | 0.0 | 0.6 | 0.4 |
| | Evaluation of yellowness index of pellets | [—] | — | — | — | bad | bad | — | bad | bad |

INDUSTRIAL APPLICABILITY

Our polyamide resin compositions are a nylon containing 1,5-pentanediamine produced from plant-derived material and have excellent heat stability and color tone and, therefore, can be advantageously used as an environmentally-friendly plastic for resin molding, films, and fibers.

Further, since nylon 56 has excellent moisture absorption and desorption properties, the polyamide resin compositions can be advantageously applied to fiber products, in particular, fiber products for clothing. In particular, it can be advantageously applied to innerwear such as pantyhose.

The invention claimed is:

1. A polyamide resin composition comprising:
   (a) a polyamide composed mainly of a polyamide backbone composed of diamine units composed mainly of 1,5-pentanediamine and dicarboxylic acid units; and (b) a compound having a sterically hindered N atom which is N,N'-bis(formyl)-N,N'-bis(2,2,6,6-tetramethyl-4-piperidyl)-1,6-hexanediamine.

2. The polyamide resin composition according to claim 1, wherein the compound (b) is added in an amount of 0.01 to 5% by weight based on 100% by weight of the polyamide (a).

3. The polyamide resin composition according to claim 1, wherein the dicarboxylic acid units are adipic acid units and/or sebacic acid units.

4. A polyamide resin composition consisting of:
  (a) a polyamide composed mainly of a polyamide backbone composed of diamine units composed mainly of biomass-derived 1,5-pentanediamine units and dicarboxylic acid units; and
  (b) a compound having a sterically hindered N atom which is 4-amino-2,2,6,6-tetramethylpiperidine.

* * * * *

UNITED STATES PATENT AND TRADEMARK OFFICE
CERTIFICATE OF CORRECTION

| | |
|---|---|
| PATENT NO. | : 9,221,950 B2 |
| APPLICATION NO. | : 14/380868 |
| DATED | : December 29, 2015 |
| INVENTOR(S) | : Ichihara et al. |

Page 1 of 1

It is certified that error appears in the above-identified patent and that said Letters Patent is hereby corrected as shown below:

Specification

<u>In column 16</u>

At line 7, please change "Example 11" to -- Example 13 --.

Signed and Sealed this
Twenty-sixth Day of July, 2016

Michelle K. Lee
*Director of the United States Patent and Trademark Office*